R. FULLARTON.
PROPELLING DEVICE FOR TRICYCLES OR SIMILAR VEHICLES.
APPLICATION FILED JULY 22, 1914.
1,180,126. Patented Apr. 18, 1916.
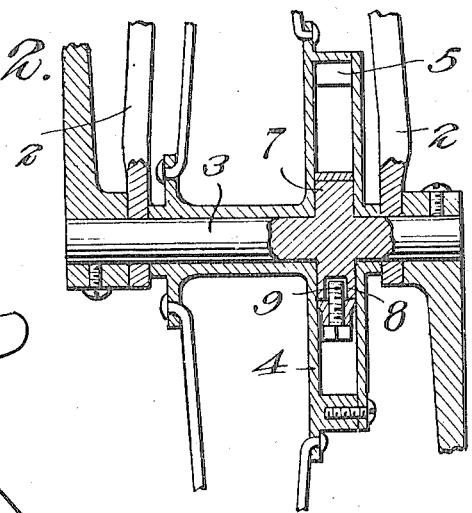
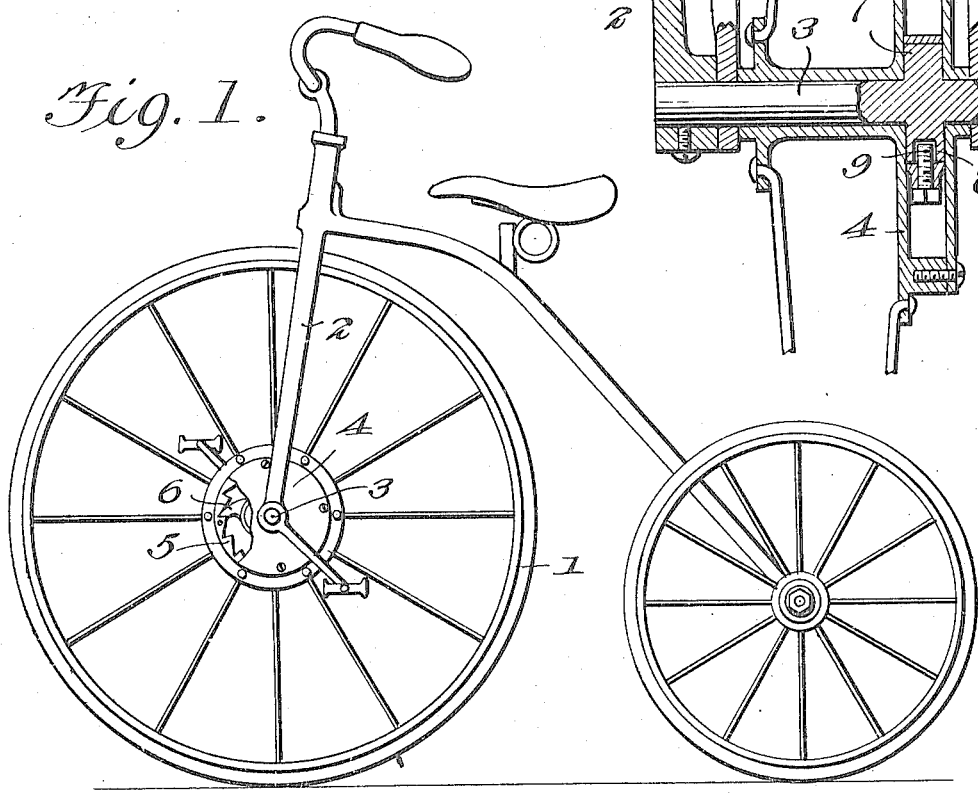
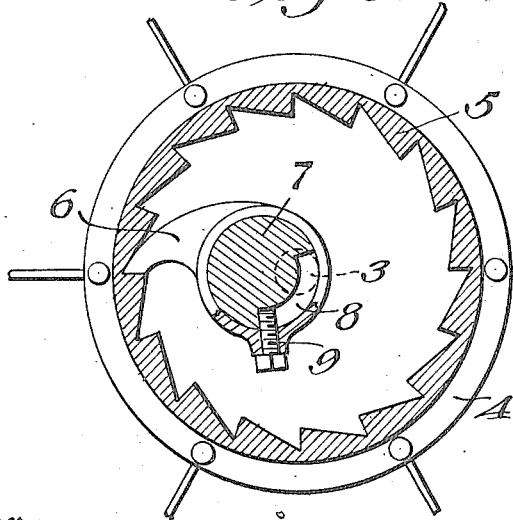
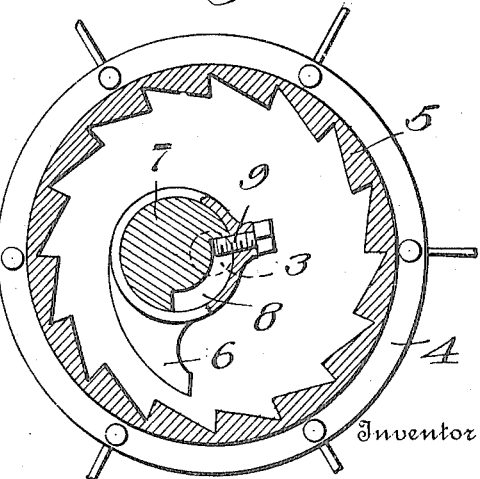
Witnesses
Hugh H. Ott
V. B. Hillyard
Inventor
Richard Fullarton
By Victor J. Evans
Attorney the invention as claimed.

UNITED STATES PATENT OFFICE.

RICHARD FULLARTON, OF LONDON, ONTARIO, CANADA.

PROPELLING DEVICE FOR TRICYCLES OR SIMILAR VEHICLES.

1,180,126.  Specification of Letters Patent.  Patented Apr. 18, 1916.

Application filed July 22, 1914. Serial No. 852,525.

*To all whom it may concern:*

Be it known that I, RICHARD FULLARTON, a citizen of Canada, residing at London, in the Province of Ontario and Dominion of Canada, have invented new and useful Improvements in Propelling Devices for Tricycles or Similar Vehicles, of which the following is a specification.

In the usual construction of tricycles for children it is common to have the drive wheel connected with the pedal shaft in such a way as to turn therewith at all times and as a result the child is compelled to pedal at all times while riding. This produces fatigue and is objectionable.

The present invention provides in effect a free wheel whereby the child may rest upon the pedals while the machine is in motion, this being rendered possible by the interposition of a ratchet mechanism between the pedal shaft and drive wheel, the pawl being thrown into operative position upon applying power to turn the pedal shaft and such pawl being thrown automatically out of action when the pedal shaft is held stationary and the drive wheel is permitted to turn as when coasting.

The invention consists of a ratchet mechanism of a peculiar structure, the ratchet member being secured to the drive wheel and the pawl member being mounted upon the pedal shaft and having a limited movement thereon, the pawl being thrown into engagement with the ratchet member when pedaling and automatically thrown out of action when the pedal shaft is held stationary and the drive wheel is permitted to turn.

The invention consists of the novel features, details of construction and combination of parts, which hereinafter will be more particularly set forth, illustrated and claimed.

In the drawings hereto attached:—Figure 1 is a detail view of a child's tricycle embodying the invention. Fig. 2 is an enlarged section of the upper portion of the drive wheel and ratchet mechanism coöperating therewith. Fig. 3 is a detail view showing the ratchet mechanism with the pawl in engagement with the teeth of the ratchet member. Fig. 4 is a view similar to Fig. 3 showing the pawl clear of the teeth of the ratchet member thereby admitting of the drive wheel running free.

Corresponding and like parts are referred to in the following description, and indicated in all the views of the drawings, by the same reference characters.

In a child's tricycle or analogous vehicle, the front wheel 1 constitutes the driver and is mounted in the front fork 2 so as to be used for steering purposes. A pedal shaft 3 is mounted in the fork members of the part 2 and receives the drive wheel 1 which in the present instance is loose upon such pedal shaft so as to turn thereon. A disk 4 is secured to the wheel 1 to turn therewith and is formed with an internally toothed rim 5. A pawl 6 is mounted upon the pedal shaft 3 and has a limited movement thereon and is adapted to engage the teeth of the rim 5. In one position of the pawl 6, it engages the toothed rim 5 thereby admitting of the power applied to the pedal shaft being transmitted to the wheel 1 for propelling the tricycle. In another position of the pawl 6, it clears the toothed rim 5 so that the wheel 1 may turn free upon the pedal shaft thereby admitting of the pedal shaft being held stationary while the machine is coasting. This operation is clear from the illustration in Figs. 3 and 4. The pedal shaft 3 is shown as having an eccentric portion 7 upon which the pawl 6 is mounted, hence relative movement of the pawl upon the eccentric 7 produces a movement of such pawl whereby the same is thrown outward into engagement with the toothed rim 5 or moved inward so as to clear the teeth of the rim 5. A groove 8 is formed in the eccentric 7 and receives the inner end of a screw 9 threaded into the hub of the pawl 6, the said screw 9 constituting a stop to cause the pawl to turn with the pedal shaft when applying power to the latter for propelling the tricycle.

From the foregoing description, taken in connection with the accompanying drawings, the advantages of the construction and of the operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In a child's tricycle or like vehicle, the combination of a pedal shaft, a drive wheel loose upon the pedal shaft, a toothed member secured to the drive wheel and rotatable therewith, and a pawl mounted upon the pedal shaft and having a limited movement thereon and adapted in one position to transmit power from the pedal shaft to the drive wheel and in another position to admit of the drive wheel turning free upon the pedal shaft while the latter is held stationary.

2. In a child's tricycle or like vehicle, the combination of a pedal shaft, a drive wheel loose upon the pedal shaft, a toothed member connected with the drive wheel to rotate therewith, an eccentric upon the pedal shaft, and a pawl mounted upon the eccentric and having a limited movement thereon and adapted in one position to transmit power from the pedal shaft to the drive wheel and in another position to admit of the drive wheel turning free upon the pedal shaft while the latter is held stationary.

3. In a child's tricycle or like vehicle, the combination of a pedal shaft having an eccentric portion in which is formed a groove, a drive wheel loose upon the pedal shaft, a toothed member connected with the drive wheel, a pawl mounted loose upon the eccentric portion of the pedal shaft and adapted to engage the teeth of the toothed member, and a stop carried by the pawl and entering the groove of the eccentric portion of the shaft and serving to cause the pawl and pedal shaft to rotate together in one direction.

In testimony whereof I affix my signature in presence of two witnesess.

RICHARD FULLARTON.

Witnesses:
James I. Fullarton,
Mrs. Fullarton.